(12) United States Patent
Park et al.

(10) Patent No.: US 10,262,408 B2
(45) Date of Patent: Apr. 16, 2019

(54) SYSTEM, METHOD AND COMPUTER PROGRAM PRODUCT FOR SYSTEMATIC AND STOCHASTIC CHARACTERIZATION OF PATTERN DEFECTS IDENTIFIED FROM A SEMICONDUCTOR WAFER

(71) Applicant: KLA-Tencor Corporation, Milpitas, CA (US)

(72) Inventors: Allen Park, San Jose, CA (US); Moshe Preil, Sunnyvale, CA (US); Andrew James Cross, Altrincham (GB)

(73) Assignee: KLA-Tencor Corporation, Milpitas, CA (US)

(*) Notice: Subject to any disclaimer, the term of this patent is extended or adjusted under 35 U.S.C. 154(b) by 58 days.

(21) Appl. No.: 15/683,631

(22) Filed: Aug. 22, 2017

(65) Prior Publication Data

US 2018/0300870 A1    Oct. 18, 2018

Related U.S. Application Data

(60) Provisional application No. 62/484,713, filed on Apr. 12, 2017.

(51) Int. Cl.
*G06T 7/00* (2017.01)
*G06K 9/62* (2006.01)

(52) U.S. Cl.
CPC .......... *G06T 7/0004* (2013.01); *G06K 9/6201* (2013.01); *G06T 2207/30148* (2013.01)

(58) Field of Classification Search
CPC ............................. G06T 7/0004; G06K 9/6201
See application file for complete search history.

(56) References Cited

U.S. PATENT DOCUMENTS

| 8,126,255 | B2 | 2/2012 | Bhaskar et al. |
| 10,025,201 | B2* | 7/2018 | Hsu ........................... G03F 1/36 |
| 2009/0055783 | A1* | 2/2009 | Florence .......... G01R 31/31831 716/136 |
| 2013/0044205 | A1 | 2/2013 | Matsumoto et al. |

(Continued)

OTHER PUBLICATIONS

Kozawa et al, "Analysis of Stochastic Effect in Line-and-Space Resist Patterns Fabricated by Extreme Ultraviolet Lithography", 2013, Appl. Phys. Express 6 026502, 5 pages (Year: 2013).*

(Continued)

*Primary Examiner* — David F Dunphy
(74) *Attorney, Agent, or Firm* — Zilka-Kotab, PC

(57) ABSTRACT

A system, method, and computer program product are provided for systematic and stochastic characterization of pattern defects identified from a fabricated component. In use, a plurality of pattern defects detected from a fabricated component are identified. Additionally, attributes of each of the pattern defects are analyzed, based on predefined criteria. Further, a first set of pattern defects of the plurality of pattern defects are determined, from the analysis, to be systematic pattern defects, and a second set of pattern defects of the plurality of pattern defects are determined, from the analysis, to be stochastic pattern defects. Moreover, a first action is performed for the determined systematic pattern defects and a second action is performed for the determined stochastic pattern defects.

19 Claims, 6 Drawing Sheets

(56) References Cited

U.S. PATENT DOCUMENTS

| | | | |
|---|---|---|---|
| 2013/0179847 A1* | 7/2013 | Hansen | G06F 17/50 |
| | | | 716/54 |
| 2014/0198975 A1 | 7/2014 | Nakagaki et al. | |
| 2015/0139531 A1 | 5/2015 | Hirai et al. | |
| 2015/0369752 A1 | 12/2015 | Honda et al. | |
| 2016/0282713 A1 | 9/2016 | Huang et al. | |
| 2018/0060702 A1* | 3/2018 | Ma | G06K 9/6269 |

OTHER PUBLICATIONS

Kozawa et al, "Relationship between stochasticity and wavelength of exposure source in lithography", 2014, Jpn. J. Appl. Phys. 53 066505, 6 pages (Year: 2014).*

International Search Report and Written Opinion from PCT Application No. PCT/US2018/025981, dated Jul. 19, 2018.

* cited by examiner

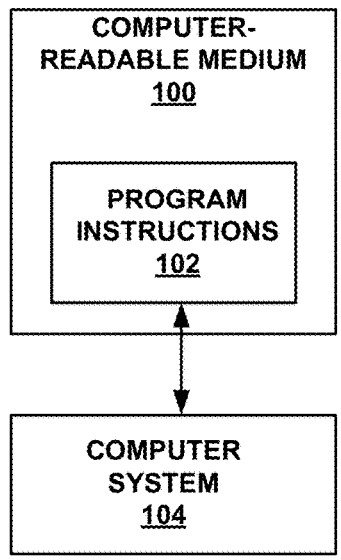
**PRIOR ART
FIGURE 1A**
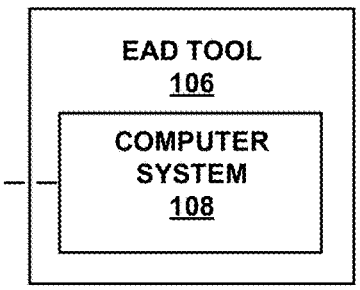
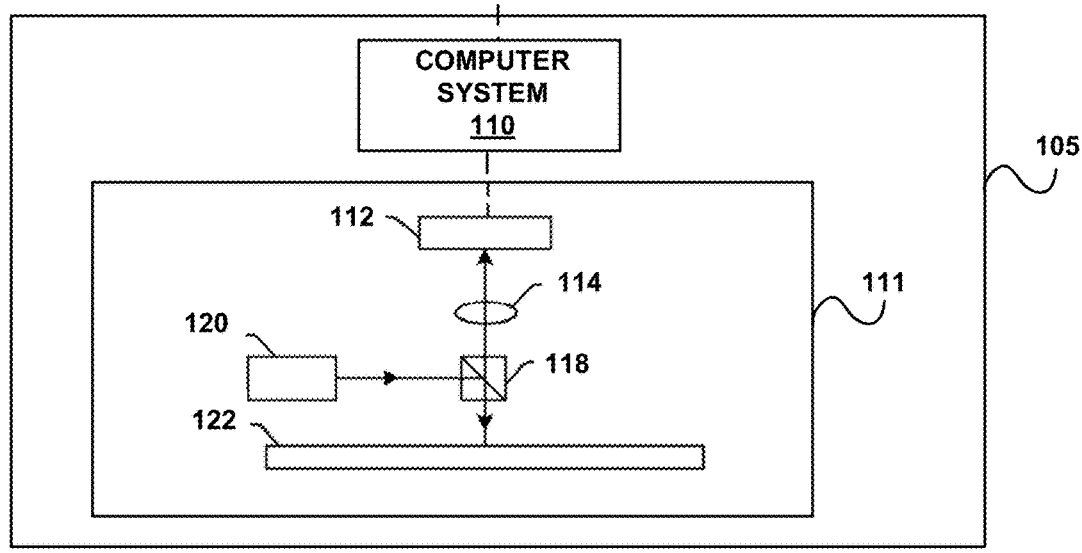
**PRIOR ART
FIGURE 1B**

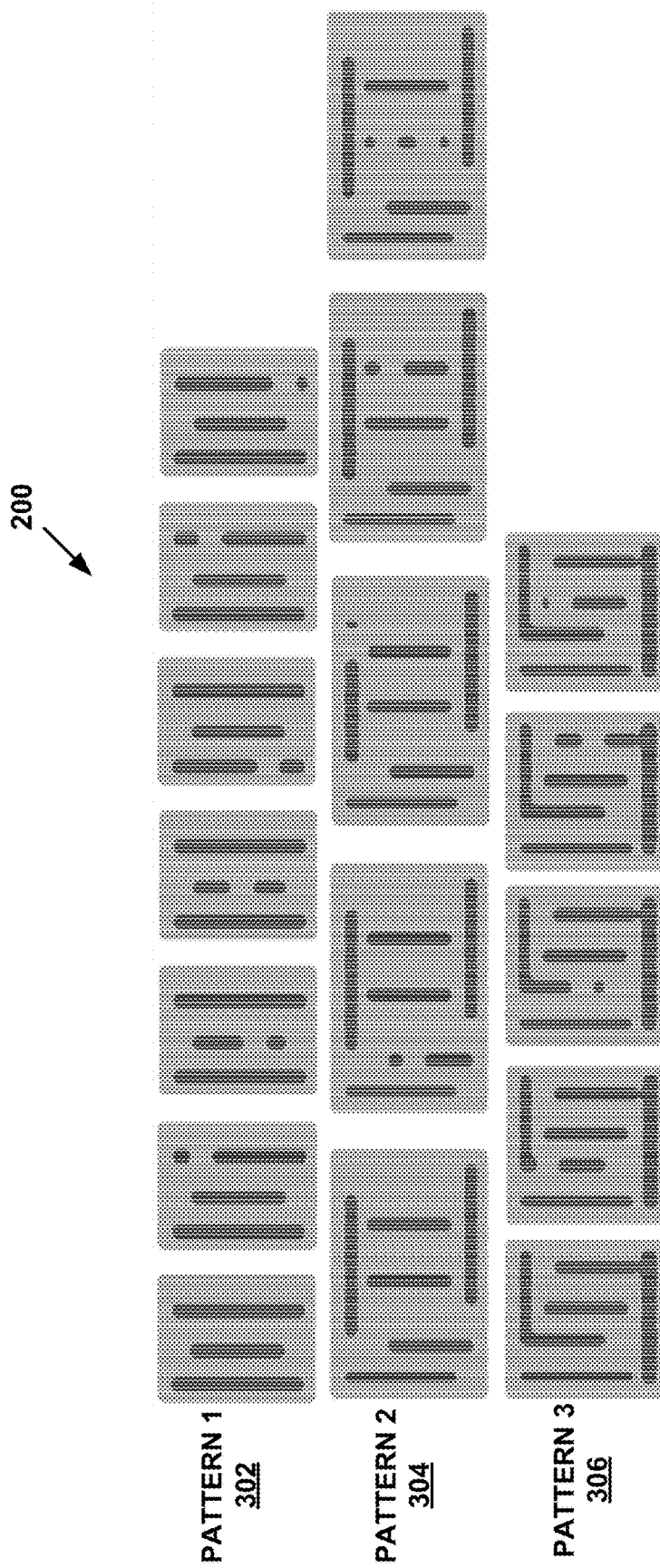

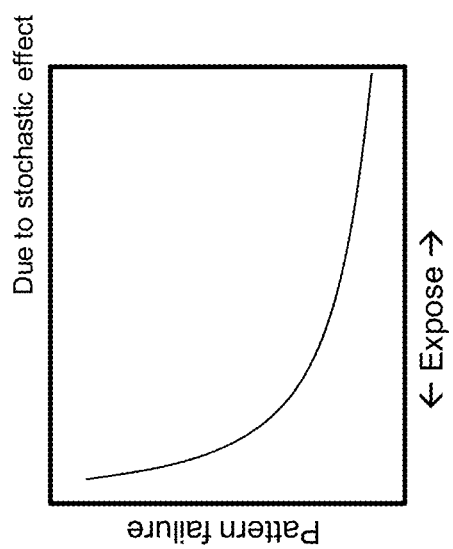
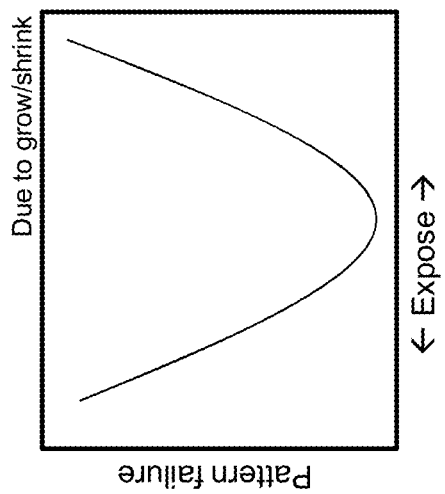
FIGURE 3

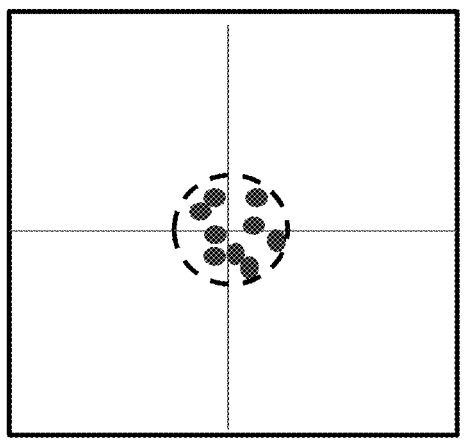
Typical location accuracy of given pattern defect
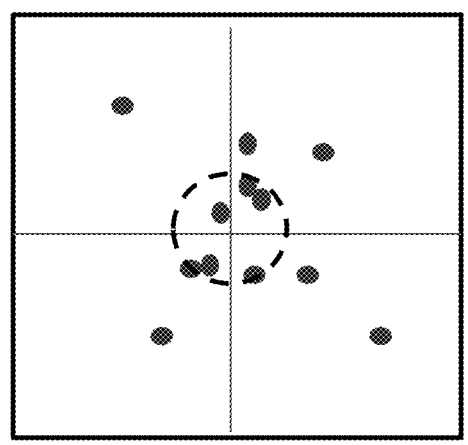
Defect distribution due to stochastic effect exceeding DLA
FIGURE 5

SYSTEM, METHOD AND COMPUTER PROGRAM PRODUCT FOR SYSTEMATIC AND STOCHASTIC CHARACTERIZATION OF PATTERN DEFECTS IDENTIFIED FROM A SEMICONDUCTOR WAFER

RELATED APPLICATION(S)

This application claims the benefit of U.S. Provisional Patent Application No. 62/484,713 filed Apr. 12, 2017, the entire contents of which are incorporated herein by reference.

FIELD OF THE INVENTION

The present invention relates to pattern defects on fabricated components, and more particularly to identifying pattern defects on fabricated components.

BACKGROUND

One aspect of semiconductor manufacturing is to identify all pattern defects on both the mask and the wafer to ensure adequate yield of advanced devices. Historically, Focus-Exposure Matrices (FEM) and Process Window Qualification (PWQ) have been processes used to identify defects on the wafer after the mask has been created and inspected. However, the defects identified were limited to systematic pattern defects.

Systematic pattern defects generally occur at a given location, and are primarily due to a weakness of the designed pattern or due to the quality of optical proximity correction (OPC) or sub-resolution assist feature (SRAF) implementations. Thus, the above mentioned processes worked reasonably well to identify pattern defects, until extreme ultraviolet lithography (EUV) was introduced.

Due to the low photon density of EUV, shot noise effects lead to uncertainty of being able to print patterns reliably and therefore even a same pattern may fail at different locations under identical exposure conditions. For example, even with a same Optical Proximity Correction (OPC) and Sub-Resolution Assist Features (SRAFs), a same pattern may print correctly at one location on the wafer while another location may fail. Location of a failure within a given pattern may vary, which is known as a stochastic effect, and identifying these stochastic defects is more challenging with the prior processes used to identify systematic defects. Though we may be able to discover patterns of interest with the prior processes there are risks due to location accuracy and this stochastic nature will lead to mis-classification and under sampling of such issues.

Accordingly, new processes in pattern grouping and sampling are needed, as well as new processes for identifying systematic defects, particularly since defect inspection plays a key role in yield management of semiconductor wafer processing for integrated circuit (IC) manufacturing. This would similarly be the case for other components fabricated using EUV.

There is thus a need for addressing these and/or other issues associated with the prior art techniques used for identifying pattern defects on fabricated components.

SUMMARY

A system, method, and computer program product are provided for systematic and stochastic characterization of pattern defects identified from a fabricated component. In use, a plurality of pattern defects detected from a fabricated component are identified. Additionally, attributes of each of the pattern defects are analyzed, based on predefined criteria. Further, a first set of pattern defects of the plurality of pattern defects are determined, from the analysis, to be systematic pattern defects, and a second set of pattern defects of the plurality of pattern defects are determined, from the analysis, to be stochastic pattern defects. Moreover, a first action is performed for the determined systematic pattern defects and a second action is performed for the determined stochastic pattern defects.

BRIEF DESCRIPTION OF THE DRAWINGS

FIG. 1A shows a block diagram illustrating one embodiment of a non-transitory computer-readable medium that includes program instructions executable on a computer system for performing one or more of the computer-implemented methods described herein.

FIG. 1B is a schematic diagram illustrating a side view of one embodiment of an inspection system configured to detect defects on a fabricated device.

FIG. 2 illustrates captured pattern images having defects at varying locations, in accordance with an embodiment.

FIG. 3 illustrates the conflicting optimization of exposure for systematic and stochastic defects, in accordance with an embodiment.

FIG. 5 illustrates defect location accuracy (DLA) for a system that detects defects from a fabricated component, and the distribution of systematic pattern failures versus stochastic pattern failures with respect to the DLA, in accordance with an embodiment.

DETAILED DESCRIPTION

Figure 4:
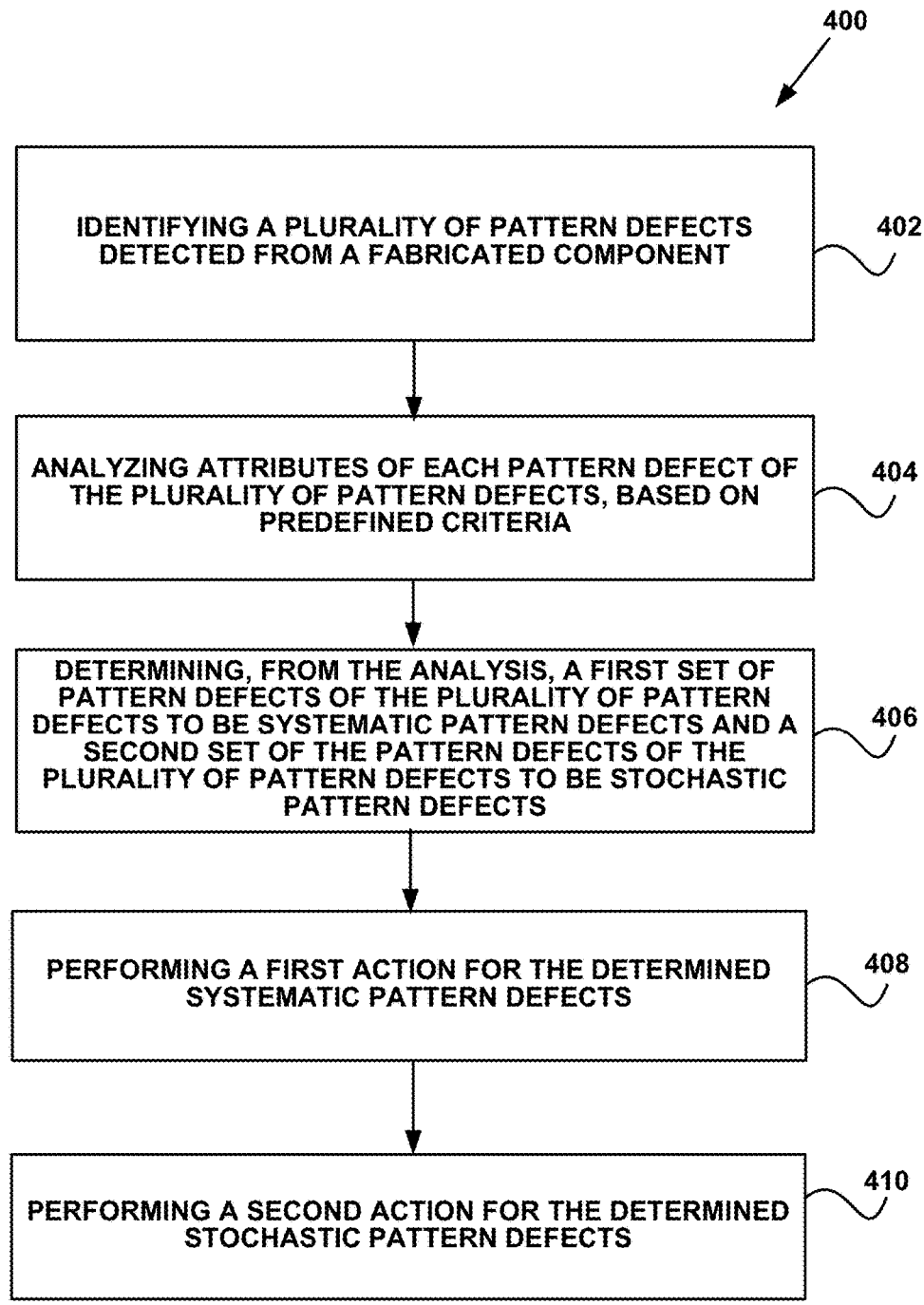
FIG. 4 illustrates a method for systematic and stochastic characterization of pattern defects identified from a fabricated component, in accordance with an embodiment.

The following description discloses a system, method, and computer program product for systematic and stochastic characterization of pattern defects identified from a fabricated component. It should be noted that this system, method, and computer program product, including the various embodiments described below, may be implemented in the context of any integrated and/or separate computer and inspection system (e.g. wafer inspection, reticle inspection, laser scanning inspection systems, etc.), such as the ones described below with reference to FIGS. 1A-B.

An additional embodiment relates to a non-transitory computer-readable medium storing program instructions executable on a computer system for performing a computer-implemented method for systematic and stochastic characterization of pattern defects identified from a fabricated component. One such embodiment is shown in FIG. 1A. In particular, as shown in FIG. 1A, computer-readable medium 100 includes program instructions 102 executable on computer system 104. The computer-implemented method includes the steps of the method described below with reference to FIG. 2. The computer-implemented method for which the program instructions are executable may include any other operations described herein.

Program instructions 102 implementing methods such as those described herein may be stored on computer-readable medium 100. The computer-readable medium may be a storage medium such as a magnetic or optical disk, or a magnetic tape or any other suitable non-transitory computer-readable medium known in the art. As an option, computer-readable medium 100 may be located within computer system 104.

The program instructions may be implemented in any of various ways, including procedure-based techniques, component-based techniques, and/or object-oriented. techniques, among others. For example, the program instructions may be implemented using ActiveX controls, C++ objects, JavaBeans, Microsoft Foundation Classes ("MFC"), or other technologies or methodologies, as desired.

The computer system 104 may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system 104 may also include any suitable processor known in the art such as a parallel processor. In addition, the computer system 104 may include a computer platform with high speed processing and software, either as a standalone or a networked tool.

An additional embodiment relates to a system configured for systematic and stochastic characterization of pattern defects identified from a fabricated component. One embodiment of such a system is shown in FIG. 1B. The system includes inspection system 105 configured to generate output for a component being fabricated on a wafer (or other device), which is configured in this embodiment as described further herein. The system also includes one or more computer systems configured for performing the operations described below with reference to FIG. 2. The one or more computer systems may be configured to perform these operations according to any of the embodiments described herein. The computer system(s) and the system may be configured to perform any other operations described herein and may be further configured as described herein.

In the embodiment shown in FIG. 1B, one of the computer systems is part of an electronic design automation (EDA) tool, and the inspection system and another of the computer systems are not part of the EDA tool. These computer systems may include, for example, the computer system 104 described above with reference to FIG. 1A. For example, as shown in FIG. 1B, one of the computer systems may be computer system 108 included in EDA tool 106. The EDA tool 106 and the computer system 108 included in such a tool may include any commercially available EDA tool.

The inspection system 105 may be configured to generate the output for the component being fabricated on a wafer by scanning the wafer with light and detecting light from the wafer during the scanning. For example, as shown in FIG. 1B, the inspection system 105 includes light source 120, which may include any suitable light source known in the art. Light from the light source may be directed to beam splitter 118, which may be configured to direct the light from the light source to wafer 122. The light source 120 may be coupled to any other suitable elements (not shown) such as one or more condensing lenses, collimating lenses, relay lenses, objective lenses, apertures, spectral filters, polarizing components and the like. As shown in FIG. 1B, the light may be directed to the wafer 122 at a normal angle of incidence. However, the light may be directed to the wafer 122 at any suitable angle of incidence including near normal and oblique incidence. In addition, the light or multiple light beams may be directed to the wafer 122 at more than one angle of incidence sequentially or simultaneously. The inspection system 105 may be configured to scan the light over the wafer 122 in any suitable manner.

Light from wafer 122 may be collected and detected by one or more channels of the inspection system 105 during scanning. For example, light reflected from wafer 122 at angles relatively close to normal (i.e., specularly reflected light when the incidence is normal) may pass through beam splitter 118 to lens 114. Lens 114 may include a refractive optical element as shown in FIG. 1B. In addition, lens 114 may include one or more refractive optical elements and/or one or more reflective optical elements. Light collected by lens 114 may be focused to detector 112. Detector 112 may include any suitable detector known in the art such as a charge coupled device (CCD) or another type of imaging detector. Detector 112 is configured to generate output that is responsive to the reflected light collected by lens 114. Therefore, lens 114 and detector 112 form one channel of the inspection system 105. This channel of the inspection system 105 may include any other suitable optical components (not shown) known in the art.

Since the inspection system shown in FIG. 1B is configured to detect light specularly reflected from the wafer 122, the inspection system 105 is configured as a BF inspection system. Such an inspection system 105 may, however, also be configured for other types of wafer inspection. For example, the inspection system shown in FIG. 1B may also include one or more other channels (not shown). The other channel(s) may include any of the optical components described herein such as a lens and a detector, configured as a scattered light channel. The lens and the detector may be further configured as described herein. In this manner, the inspection system 105 may also be configured for DF inspection.

The inspection system 105 may also include a computer system 110 that is configured to perform one or more steps of the methods described herein. For example, the optical elements described above may form optical subsystem 111 of inspection subsystem 105, which may also include computer system 110 that is coupled to the optical subsystem 111. In this manner, output generated by the detector(s) during scanning may be provided to computer system 110. For example, the computer system 110 may be coupled to detector 112 (e.g., by one or more transmission media shown by the dashed line in FIG. 1B, which may include any suitable transmission media known in the art) such that the computer system 110 may receive the output generated by the detector.

The computer system 110 of the inspection system 105 may be configured to perform any operations described herein. For example, computer system 110 may be configured for systematic and stochastic characterization of pattern defects identified from a fabricated component, as described herein. In addition, computer system 110 may be configured to perform any other steps described herein. Furthermore, although some of the operations described herein may be performed by different computer systems, all of the operations of the method may be performed by a single computer system such as that of the inspection system 105 or a stand alone computer system. In addition, the one or more of the computer system(s) may be configured as a virtual inspector such as that described in U.S. Pat. No. 8,126,255 issued on Feb. 28, 2012 to Bhaskar et al., which is incorporated by reference as if fully set forth herein.

The computer system 110 of the inspection system 105 may also be coupled to another computer system that is not part of the inspection system such as computer system 108, which may be included in another tool such as the EDA tool 106 described above such that computer system 110 can receive output generated by computer system 108, which may include a design generated by that computer system 108. For example, the two computer systems may be effectively coupled by a shared computer-readable storage medium such as a fab database or may be coupled by a transmission medium such as that described above such that information may be transmitted between the two computer systems.

It is noted that FIG. 1B is provided herein to generally illustrate a configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the 29xx/28xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

FIG. 2 illustrates captured pattern images 200 having defects at varying locations, in accordance with an embodiment. The captured pattern images 200 are images captured (e.g. by an inspection tool) from a fabricated component for three different patterns 302, 304, 306. The fabricated component is constructed using EUV which provides low photon density.

For each of the patterns 302, 304, 306, differences across the sequence of images indicates a defect (i.e. failure). As shown, however, at least some of the defects occur at varying locations for each of the patterns 302, 304, 306 due to stochastic effect, such that those defects are not considered systematic (i.e. location-dependent). Any defects occurring at a same location for each of the patterns 302, 304, 306 may be considered systematic defects.

FIG. 3 illustrates the conflicting optimization of exposure for systematic and stochastic defects, in accordance with an embodiment. As shown, for systematic defects, the number of defects can be minimized at a particular optimal exposure modulation. However, for stochastic defects, the optimal exposure modulation at which defects are minimized differs from the optimal exposure modulation for the systematic defects. Thus, there is a conflicting optimization of exposure for systematic and stochastic defects.

FIG. 4 illustrates a method 400 for systematic and stochastic characterization of pattern defects identified from a fabricated component, in accordance with an embodiment.

As shown in operation 402, a plurality of pattern defects detected from a fabricated component are identified. In the context of the present description, the fabricated component is any component constructed using a fabrication process capable of causing defects on the component. For example, in one embodiment, the fabricated component may be a die on a semiconductor wafer. Further, the fabricated component may be constructed using extreme ultraviolet lithography (EUV), which is particularly prone to stochastic defects when low dose of exposure is used, or any other process that is prone to stochastic defects.

As noted above, pattern defects detected from the fabricated component are identified. Each of the pattern defects may be a defect associated with a particular pattern printed on the fabricated component. Thus, the pattern defects may be defects detected for different patterns on the fabricated component.

In one embodiment, the pattern defects may be identified by first receiving an indication of a plurality of defects detected from the fabricated component. For example, the indication of the defects detected from the fabricated component may be received from an inspection system that detected the plurality of defects from the fabricated component. The pattern defects may further be identified by grouping (i.e. binning) the indicated defects by pattern type, such that each group represents a different pattern defect of the plurality of pattern defects.

Additionally, as shown in operation 404, attributes of each of the pattern defects are analyzed, based on predefined criteria. In general, the attributes may be a frequency of failure, a location distribution, and a focus/exposure (i.e. modulation) condition or other modulation condition specific to an EUV process. In the embodiment described above where a pattern defect is represented by a grouping of defects detected from a same pattern, the attributes the pattern defect that are analyzed may be collected from the defects included in the group. Just by way of example, a location of each of the defects and a focus/exposure condition of each of the defects may be collected.

As mentioned above, the attributes are analyzed based on predefined criteria. This may include, for each pattern defect, grouping (i.e. binning) defects associated with the pattern defect according to the predefined criteria. The predefined criteria may include various different criterions capable of being used to indicate whether a particular pattern defect being analyzed is a stochastic defect or a systematic defect.

In one embodiment, the predefined criteria may include a first criterion associated with a distribution of locations of defects within a pattern specific to the pattern defect. Thus, in this embodiment, analyzing the attributes of the pattern defect based on the first criterion may include determining whether the distribution of locations of the defects represented by the pattern defect exceed particular threshold. Optionally, this first criterion may use defect location accuracy (DLA) of the system that detected the defects as the threshold, or as a basis to optimize the threshold.

In another embodiment, the predefined criteria may include a second criterion associated with a frequency of defects within the pattern specific to the pattern defect. Accordingly, in this embodiment, analyzing the attributes of the pattern defect based on the second criterion may include determining whether the frequency of defects represented by the pattern defect exceeds a particular threshold. In various embodiments, the frequency of defects may be determined for a particular modulation setting of the fabricated component, determined across different modulation settings, determined across a wafer that includes the fabricated component, and/or determined across multiple repeating wafers that each include the fabricated component.

Further, as shown in operation 406, a first set of pattern defects of the plurality of pattern defects are determined, from the analysis, to be systematic pattern defects, and a second set of pattern defects of the plurality of pattern defects are determined, from the analysis, to be stochastic pattern defects. In general, the systematic pattern defects may each be a location dependent pattern defect, whereas the stochastic pattern defects may each be a location independent pattern defect.

In one embodiment, determining from the analysis which of the pattern defects are systematic pattern defects and which of the pattern defects are stochastic pattern defects may include, for each of the pattern defects, applying at least one predefined rule to a result of the analysis to determine whether the pattern defect is a systematic pattern defect or a stochastic pattern defect. Each rule may take into consideration a combination of the criterion by which the pattern defect is analyzed.

Just by way of example, one rule may indicate that a pattern defect is a stochastic defect when a location distribution for that pattern defect exceeds a given threshold and when a defect frequency for that pattern defect across a particular modulation that also exceeds a given threshold. As another example, a second rule may indicate that a pattern defect is a systematic defect when a location distribution for that pattern defect does not exceed a given threshold and when a defect frequency for that pattern defect across a particular modulation exceeds a given threshold.

Moreover, as shown in operation 408, a first action is performed for the determined systematic pattern defects and a second action is performed for the determined stochastic pattern defects. The first action and the second action may be, at least in part, different from one another. Thus, the first and second actions may partially overlap, or may not overlap at all. In any case, the first and second actions are performed to minimize or prevent the pattern defects on fabricated components that are subsequently constructed.

In one embodiment, the first action may include optimizing a pattern associated with each of the systematic pattern defects (e.g. changing a shape of the pattern or different OPC features). In another embodiment, the second action may include optimizing modulations for the pattern associated with each of the stochastic pattern defects (e.g. in order to provide sufficient photon density during the EUV process). Of course, it should be noted that the first action may be performed independently for each systematic pattern defect and may be selected based on the attributes of that systematic pattern defect in order to minimize or prevent the same on subsequently constructed fabricated components. Likewise, the second action may be performed independently for each stochastic pattern defect and may be selected based on the attributes of that stochastic pattern defect in order to minimize or prevent the same on subsequently constructed fabricated components.

FIG. 5 illustrates DLA for a system that detects defects from a fabricated component, and the distribution of systematic pattern failures versus stochastic pattern failures with respect to the DLA, in accordance with an embodiment.

As shown, defects detected for any one particular systematic pattern defect are typically encompassed by the DLA for the inspection system (DLA is the dashed circle, as shown). Thus, while the locations of these defects can vary, they typically do not vary beyond the accuracy of the system.

However, defects detected for any one particular stochastic pattern defect are not encompassed by the DLA for the inspection system, but can vary to an extent that is greater than that provided by the accuracy of the system.

To this end, since DLA is typically known for any particular inspection system, location distribution of defects for a pattern defect can be one criterion for determining whether the pattern defect is a systematic pattern defect or a stochastic pattern defect.

Figure 6:
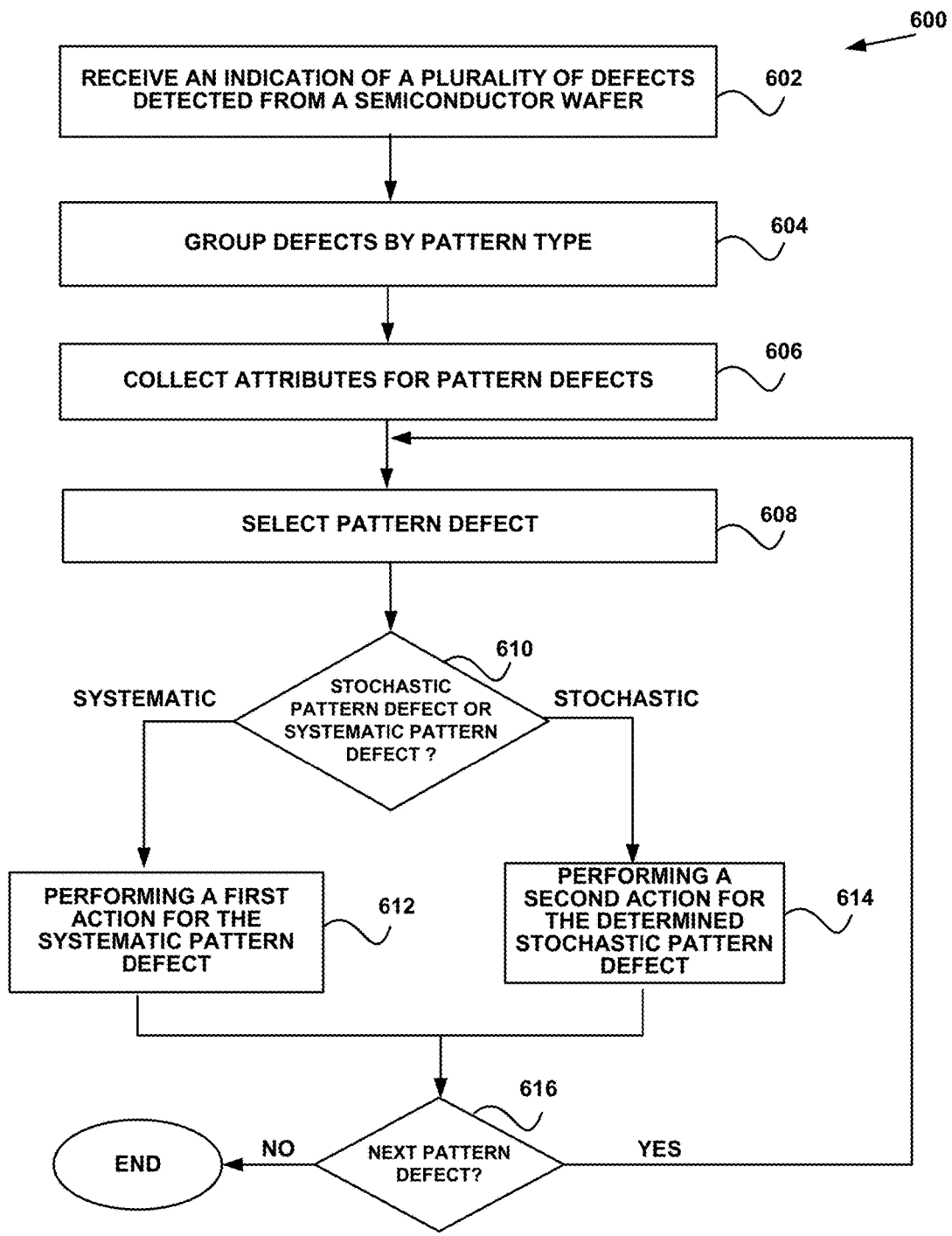
FIG. 6 illustrates a method for systematic and stochastic characterization of pattern defects identified from a semiconductor wafer, in accordance with an embodiment.

FIG. 6 illustrates a method 600 for systematic and stochastic characterization of pattern defects identified from a semiconductor wafer, in accordance with an embodiment. The method 600 may be carried out in the context of the method 400 of FIG. 4, in one embodiment. Of course, the method 600 may be carried out in other contexts as well. It should be noted that the definitions given above may equally apply to the present description.

As shown in operation 602, an indication of a plurality of defects detected form a semiconductor wafer is received. This indication may be received from an inspection tool as a result of an inspection process performed on the semiconductor wafer. Additionally, as shown in operation 604, the defects are grouped by pattern type. Thus, defects detected from a same pattern may be grouped together to represent a pattern defect.

Further, as shown in operation 606, attributes for the pattern defects are collected. For any particular pattern defect, the attributes may be collected from the defects grouped by that associated pattern. In operation 608, one of the pattern defects is selected.

It is then determined in decision 610 whether the selected pattern defect is a systematic pattern defect or a stochastic pattern defect. This determination may be made by analyzing the attributes according to predefined criteria, and then applying one or more predefined rules to a result of the analysis. Table 1 illustrates examples of the predefined criteria by which the pattern defect attributes may be analyzed. Of course, it should be noted that the examples set forth in Table 1 are for illustrative purposes only.

Table 1

Group defects in 'x' distance in proximity (i.e. location distribution) that share 'y' amount of similar features.

Computation of defect rate for a given pattern within and across modulations. Data from one or more of same process condition may be used.

Use of defect location distribution relative to system DLA to identify defects due to stochastic effect.

Comparison of defect frequency of given pattern among shots with identical process condition (modulation).

Use of pattern grouping (e.g. design based binning (DBG)) in conjunction with actual defect location and frequency to separate systematic pattern defect from stochastic defect.

Comparison of defect characteristics between defects from low and high dose modulations. Less stochastic failures may be seen at high modulation verses lower modulation.

When the selected pattern defect is determined to be a systematic pattern defect, a first action is taken, as shown in operation 612. When the selected pattern defect is determined to be a stochastic pattern defect, a second action is taken, as shown in operation 614. Thus, different actions may be taken depending whether the pattern defect is determined to be a systematic pattern defect or a stochastic pattern defect. After the first/second action is taken, the method 600 determines in decision 616 whether there is another pattern defect to analyze. When it is determined that there is another pattern defect to analyze, the method 600 returns to operation 608 for that next pattern defect. When it is determined that there is not another pattern defect to analyze, the method 600 terminates.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing a computer program product having code executable by a processor to perform a method comprising:
   identifying a plurality of pattern defects detected from a fabricated component;
   analyzing attributes of each of the pattern defects, based on predefined criteria;
   determining, from the analysis, a first set of pattern defects of the plurality of pattern defects to be systematic pattern defects and a second set of pattern defects of the plurality of pattern defects to be stochastic pattern defects;
   performing a first action for the determined systematic pattern defects; and
   performing a second action for the determined stochastic pattern defects.

2. The non-transitory computer readable medium of claim 1, wherein the fabricated component is a die on a semiconductor wafer.

3. The non-transitory computer readable medium of claim 1, wherein the fabricated component is constructed using extreme ultraviolet lithography (EUV).

4. The non-transitory computer readable medium of claim 1, wherein the plurality of pattern defects is identified by:
   receiving an indication of a plurality of defects detected from the fabricated component,
   grouping the plurality of defects by pattern type, wherein each group represents a different pattern defect of the plurality of pattern defects.

5. The non-transitory computer readable medium of claim 4, wherein the indication of the plurality of defects detected from the fabricated component is received from an inspection system that detected the plurality of defects from the fabricated component.

6. The non-transitory computer readable medium of claim 4, further comprising collecting the attributes of each of the pattern defects from the plurality of defects.

7. The non-transitory computer readable medium of claim 1, wherein the attributes include a frequency of failure, location distribution, and a focus/exposure or other modulated condition.

8. The non-transitory computer readable medium of claim 1, wherein the predefined criteria includes a first criterion associated with a distribution of locations of defects within a pattern specific to the pattern defect.

9. The non-transitory computer readable medium of claim 8, wherein the first criterion uses defect location accuracy (DLA) of a system that detected the defects as a threshold.

10. The non-transitory computer readable medium of claim 8, wherein the predefined criteria includes a second criterion associated with a frequency of defects within the pattern specific to the pattern defect.

11. The non-transitory computer readable medium of claim 10, wherein the frequency of defects is at least one of:
    determined for a particular modulation setting,
    determined across different modulation settings,
    determined across a wafer that includes the fabricated component, and
    determined across multiple repeating wafers that include the fabricated component.

12. The non-transitory computer readable medium of claim 1, wherein analyzing the attributes of each of the pattern defects, based on predefined criteria, includes binning defects associated with the pattern defect according to the predefined criteria.

13. The non-transitory computer readable medium of claim 1, wherein determining, from the analysis, the first set of pattern defects of the plurality of pattern defects to be systematic pattern defects and the second set of pattern defects of the plurality of pattern defects to be stochastic pattern defects includes, for each of the pattern defects:
    applying at least one predefined rule to a result of the analysis to determine whether the pattern defect is a systematic pattern defect or a stochastic pattern defect.

14. The non-transitory computer readable medium of claim 1, wherein each of the stochastic pattern defects is a location independent pattern defect.

15. The non-transitory computer readable medium of claim 1, wherein the first action is, at least in part, different from the second action.

16. The non-transitory computer readable medium of claim 1, wherein the first action includes optimizing a pattern associated with each of the systematic pattern defects.

17. The non-transitory computer readable medium of claim 1, wherein the second action includes optimizing modulations for the pattern associated with each of the stochastic pattern defects.

18. A method comprising:
    identifying a plurality of pattern defects detected from a fabricated component;
    analyzing attributes of each of the pattern defects, based on predefined criteria;
    determining, from the analysis, a first set of pattern defects of the plurality of pattern defects to be systematic pattern defects and a second set of pattern defects of the plurality of pattern defects to be stochastic pattern defects;
    performing a first action for the determined systematic pattern defects; and
    performing a second action for the determined stochastic pattern defects.

19. A system, comprising:
    a computer processor for:
    identifying a plurality of pattern defects detected from a fabricated component;
    analyzing attributes of each of the pattern defects, based on predefined criteria;
    determining, from the analysis, a first set of pattern defects of the plurality of pattern defects to be systematic pattern defects and a second set of pattern defects of the plurality of pattern defects to be stochastic pattern defects;
    performing a first action for the determined systematic pattern defects; and
    performing a second action for the determined stochastic pattern defects.

* * * * *